United States Patent
Robert et al.

(10) Patent No.: US 8,966,263 B2
(45) Date of Patent: Feb. 24, 2015

(54) SYSTEM AND METHOD OF NETWORK EQUIPMENT REMOTE ACCESS AUTHENTICATION IN A COMMUNICATIONS NETWORK

(75) Inventors: Jean-Marc Robert, Ottawa (CA); Koen Jan Van De Weyer, Lokeren (BE); Katrien B. N. Scharre, Melsele (BE)

(73) Assignee: Alcatel Lucent, Boulogne-Billancourt (FR)

( * ) Notice: Subject to any disclaimer, the term of this patent is extended or adjusted under 35 U.S.C. 154(b) by 2826 days.

(21) Appl. No.: 11/393,879

(22) Filed: Mar. 31, 2006

(65) Prior Publication Data
US 2007/0234054 A1     Oct. 4, 2007

(51) Int. Cl.
*H04L 29/06* (2006.01)

(52) U.S. Cl.
CPC ............ *H04L 63/0823* (2013.01); *H04L 63/12* (2013.01)
USPC .......................................... 713/170

(58) Field of Classification Search
CPC .................................. H04L 63/0823
USPC ............................ 380/282, 285; 713/155, 170
See application file for complete search history.

(56) References Cited

U.S. PATENT DOCUMENTS

| | | | | |
|---|---|---|---|---|
| 6,011,910 | A * | 1/2000 | Chau et al. ..................... | 709/229 |
| 6,061,799 | A * | 5/2000 | Eldridge et al. ................ | 726/20 |
| 2006/0168357 | A1* | 7/2006 | Nakano et al. .................... | 710/5 |

OTHER PUBLICATIONS

"Using RADIUS Authentication with SSH Tectia™ Client and Server", SSH Communications Security Corp., Compatibility Note, Nov. 2004, available at www.ssh.com.

* cited by examiner

*Primary Examiner* — Michael S McNally
(74) *Attorney, Agent, or Firm* — Kramer Amado, P.C.

(57) ABSTRACT

A system and method are provided for key-based network equipment remote access authentication. A remote client machine and a piece of network equipment perform client-server authentication while the network equipment employs an access validation server to perform access validation for key-based authentication.

21 Claims, 5 Drawing Sheets

100

120

150

170

SYSTEM AND METHOD OF NETWORK EQUIPMENT REMOTE ACCESS AUTHENTICATION IN A COMMUNICATIONS NETWORK

FIELD OF THE INVENTION

The invention relates to remote access authentication in a communications network, and more particularly to key-based access authentication for administrators remotely accessing network equipment.

BACKGROUND OF THE INVENTION

In communications networks, administrators often have to remotely communicate with network equipment. As with any distributed and open environment, security for remote access to that network equipment (e.g. network servers, routers, switches) is essential. Methods to assure confidentiality and the integrity of the remote communication have been developed as well as methods to assure the identity of the communication participants. Typically, administrators rely on the SSH (secure shell) protocol to establish secure communications with remote network equipment.

The SSH protocol is a client-server protocol which provides a secure transport layer assuring confidentiality and integrity for communications conducted over that transport layer. Furthermore, the SSH protocol provides for client and server authentication which allows the client and server in the client-server architecture to authenticate each other.

The SSH protocol offers three different client authentication methods: host-based authentication (which is not recommended since it can easily be used by a fraudulent attacker); password-based authentication; and public-key authentication (which is mandatory according to the SSH standard).

The classical password-based authentication method is often used since it can be easily integrated with existing technology. When an SSH server receives a user ID (user-identification)/password pair, it can rely on a local table or local database to validate the passwords. For a large distributed system, the SSH server can also rely on a central password validating server to validate the password. The central password validating server can be an authentication authorization and accounting (AAA) server such as a RADIUS (Remote Authentication Dial In User Service) server to validate the passwords. SSH Communications Security offers such a solution in which an SSH server accesses a central RADIUS server to perform password based user authentication.

In comparison to public-key authentication, the classical password-based authentication method is not preferable because it is vulnerable to replay attacks. Once a password has been detected and hence compromised, completely unauthorized parties can use it by "replaying" the detected password.

The most secure method of authentication, public-key authentication, typically is implemented by registering in a local key table or key database (registry) all the public keys of the potential clients. This approach does not scale easily for large distributed networks employing a large number of client administrator consoles and an even larger number of administrator users. Since each administrator console and each administrator user may have to "register" credentials on each piece of network equipment it requires access to, a communications system with numerous such consoles, administrators, and numerous pieces of network equipment would be cumbersome to manage, requiring frequent updates of many local key registries.

An example of such a prior art approach to key-based authentication is presented in FIG. 1. In a communications network 1, first, second, and third client machines 2a, 2b, 2c are connected by first, second, and third network connections 5a, 5b, 5c.i respectively to a first piece of network equipment 8a. The third client machine 2c is connected by a fourth network connection 5c.ii to a second piece of network equipment 8b. The client machines 2a, 2b, 2c are administrator consoles requiring secure remote connections to the network equipment 8a, 8b. The connections 5a, 5b, 5c.i, 5c.ii are secure SSH connections, and each piece of network equipment 8a, 8b is a network switch. Each piece of network equipment 8a, 8b has a respective public key database registry 9a, 9b for validating clients.

First client machine 2a attempts to access the first piece of network equipment 8a. For key-based authentication to occur, first client machine 2a passes either the console's or the administrator's credentials including its public key over the first network connection 5a to the network switch 8a which then looks in its public key database registry 9a to validate the first client machine 2a. If the first client machine 2a's credentials with its public key are in the key registry 9a, the first client machine 2a is validated, otherwise the first client machine 2a is invalidated. Based on the validity of the first client machine 2a, the network switch 8a can accept or refuse to continue the communication with the first client machine 2a.

The third client machine 2c attempts to access the first piece of network equipment 8a and the second piece of network equipment 8b over the third and fourth network connections 5c.i, 5c.ii respectively. As with the first client machine 2a, for key-based authentication to occur the third client machine 2c must transmit either the console's or the administrator's credentials including the public key to each piece of network equipment 8a, 8b which need to individually validate the third client machine 2c by looking in its respective key database registry 9a, 9b. It is clear that this prior art method of public key authentication requires that the key registry of every piece of network equipment must be updated whenever a client console or administrator requiring access to that piece of network equipment is added to the communications network or whenever access privileges of existing client consoles or administrators are otherwise modified.

A robust deployment solution would rely on a Public-Key Infrastructure (PKI), however, the cost of such a solution is prohibitive to implementation of a system relying on PKI. As of today no simple solution has been presented to ease the deployment of the strong authentication method of key-based authentication.

SUMMARY OF THE INVENTION

According to one aspect, the invention provides for a key-based access authentication system comprising, a client for generating an access authentication request comprising an access public key of an access entity and an access identification of the access entity, a network element for receiving the access authentication request from the client, and for generating an access validation request comprising an access public key identifier of the access public key and the access identification, said access authentication request for an access of the network element by the access entity; and an access validation server for receiving the access validation request from the network element, and for determining if the access public key identifier is associated with the access identification, and for sending a return message indicating a validity of the access to the network element.

In some embodiments of the invention the access validation server is adapted to determine if the access public key identifier is associated with the access identification by searching for a stored access validation entry comprising the access public key identifier and the access identification.

In some embodiments of the invention the access validation entry is stored in a local database of the access validation server.

In some embodiments of the invention the network element is adapted to receive the access authentication request as part of an establishment of a secure network connection between the client and the network element.

In some embodiments of the invention the access public key identifier is the access public key. In other embodiments the access public key identifier is a fingerprint of the access public key.

In some embodiments of the invention the network element is adapted to generate the fingerprint by performing a function on the access public key.

In some embodiments of the invention the function performed to generate the fingerprint is such that the size of the fingerprint is smaller than the size of the access public key.

In some embodiments of the invention the function is a secure hashing function and in some embodiments an MD5 hashing function and in some embodiments an SHA-1 hashing function.

In some embodiments of the invention the network element is adapted to authenticate the access with use of the return message.

In some embodiments of the invention the access authentication request comprises an access signature generated with use of an access private key of the access entity, in which the network element is adapted to authenticate the access with use of the access signature.

In some embodiments of the invention the network element is adapted to determine a validity of the access signature with use of the access public key and wherein the network element is adapted to accept the access authentication request if the return message indicates the access is valid and if the network element determines the access signature is valid.

In some embodiments of the invention the network element is adapted to reject the access authentication request if the return message indicates the access is invalid and is adapted to reject the access authentication request if the network element determines the access signature is invalid.

In some embodiments of the invention the secure network connection is an SSH (secure shell) connection.

In some embodiments of the invention the access validation server is an AAA (authentication authorization and accounting) server.

In some embodiments of the invention the access validation server is a RADIUS server.

In some embodiments of the invention the network element is a network server, a network switch, or a network router.

In some embodiments of the invention the client is an administrator console and the access entity is an administrator or the client itself.

According to another aspect the invention provides for a key-based access authentication system comprising: a client for generating an access authentication request comprising an access public key of an access entity, an access identification of the access entity, and an access signature generated with use of an access private key of the access entity; a network element for receiving from the client the access authentication request as part of an establishment of an SSH (secure shell) connection between the client and the network element, for generating a fingerprint of the access public key by performing a secure hashing function on the access public key, and for generating an access validation request comprising the fingerprint of the access public key and the access identification, the access authentication request for an access of the network element by the access entity; and an access validation server for receiving the access validation request from the network element, for searching a local database for a stored access validation entry comprising the fingerprint and the access identification, and for sending a return message indicating a validity of the access to the network element; wherein the network element is adapted to determine a validity of the access signature with use of the access public key, and is adapted to authenticate the access by: accepting the access authentication request if the return message indicates the access is valid and if the network element determines the access signature is valid; rejecting the access authentication request if the return message indicates the access is invalid; and rejecting the access authentication request if the network element determines the access signature is invalid.

According to another aspect the invention provides for a method of key-based access authentication comprising: generating at a client an access authentication request comprising an access public key of an access entity and an access identification of the access entity; sending the access authentication request from the client; receiving the access authentication request at a network element, the access authentication for an access of the network element by the access entity; generating at the network element an access validation request comprising an access public key identifier of the access public key and the access identification; sending the access validation request from the network element; receiving the access validation request at an access validation server; determining at the access validation server if the access public key identifier is associated with the access identification; sending from the access validation server a return message indicating a validity of the access; receiving at the network element the return message; and authenticating the access at the network element with use of the return message.

In some embodiments of the invention the step of determining if the access public key identifier is associated with the access identification comprises searching for a locally stored access validation entry comprising the access public key identifier and the access identification.

In some embodiments of the invention the access authentication request is received by the network element as part of an establishment of a secure network connection between the client and the network element.

In some embodiments of the invention the access public key identifier is a fingerprint of the access public key and wherein the step of generating the access validation request further comprises generating a fingerprint of the access public key by performing a secure hashing function on the access public key such that the size of the fingerprint is smaller than the size of the access public key.

In some embodiments of the invention the step of generating the access authentication request further comprises generating an access signature with use of an access private key of the access entity, and wherein the step of authenticating the access further comprises: determining a validity of the access signature with use of the access public key to generate a determination of validity of the access signature; accepting the access authentication request if the return message indicates the access is valid and if the determination of validity of the access signature indicates the access signature is valid; rejecting the access authentication request if the return message indicates the access is invalid; and rejecting the access authentication request if the determination of validity of the access signature indicates the access signature is invalid.

According to another aspect, the invention provides for a method of key-based access authentication comprising: generating at a client an access authentication request from the client as part of an establishing of an SSH (secure shell) connection between the client and the network element, said access authentication request comprising an access public key of an access entity, an access identification of the access entity, and an access signature generated with use of an access private key of the access entity; sending the access authentication request from the client; receiving the access authentication request at a network element, the access authentication request for an access of the network element by the access entity; generating at the network element a fingerprint of the access public key by performing a secure hashing function on the access public key; generating at the network element an access validation request comprising the fingerprint of the access public key and the access identification; sending the access validation request from the network element; receiving the access validation request at an access validation server; searching a local database at the access validation server for a stored access validation entry comprising the fingerprint and the access identification; sending a return message indicating a validity of the access from the access validation server; receiving at the network element the return message; determining a validity of the access signature at the network element with use of the access public key to generate a determination of validity of the access signature; authenticating the access at the network element by: accepting the access authentication request if the return message indicates the access is valid and if the determination of validity of the access signature indicates the access signature is valid; rejecting the access authentication request if the return message indicates the access is invalid; and rejecting the access authentication request if the determination of validity of the access signature indicates the access signature is invalid.

According to another aspect the invention provides for a client for a key-based access authentication system for generating an access authentication request comprising an access public key of an access entity, an access identification of the access entity, and an access signature generated with use of an access private key of the access entity, and for sending the access authentication request to a network element as part of an establishment of an SSH (secure shell) connection between the client and the network element.

According to another aspect the invention provides for a network element for a key-based access authentication system for receiving from a client an access authentication request comprising an access public key of an access entity, an access identification of the access entity, and an access signature generated with use of an access private key of the access entity, the access authentication request received as part of an establishment of an SSH (secure shell) connection between the client and the network element, said access authentication request for an access of the network element by the access entity, for generating a fingerprint of the access public key by performing a secure hashing function on the access public key, for generating an access validation request comprising the fingerprint of the access public key and the access identification, for sending the access validation request to an access validation server, and for receiving a return message from the access validation server, wherein the network element is adapted to determine a validity of the access signature with use of the access public key, and is adapted to authenticate the access by: accepting the access authentication request if the return message indicates the access is valid and if the network element determines the access signature is valid; rejecting the access authentication request if the return message indicates the access is invalid; and rejecting the access authentication request if the network element determines the access signature is invalid.

According to another aspect the invention provides for an access validation server for a key-based access authentication system for receiving an access validation request from a network element, for searching a local database for a stored access validation entry comprising a fingerprint of a public key of an access entity and the access identification, and for sending a return message indicating a validity of an access to the network element by the access entity.

According to another aspect the invention provides for a method of registering access for an access entity in a key-based access authentication system, the method comprising: generating for the access entity an access public key, an access private key, and an access identification of the access entity; associating the access identification with the access private key and the access public key; determining if an access public key identifier of the access public key is to be a fingerprint of the access public key to generate a determination indicating whether the access public key identifier is to be a fingerprint; generating an access validation entry comprising the access identification and an access public key identifier which is in the case that the determination indicates that the access public key identifier is to be a fingerprint, a fingerprint of the access public key generated by performing a secure hashing function on the access public key and, and in the case that the determination indicates that the access public key identifier is not to be a fingerprint, the access public key; and storing the access validation entry in an access validation server.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE PREFERRED EMBODIMENTS

Figure 1:
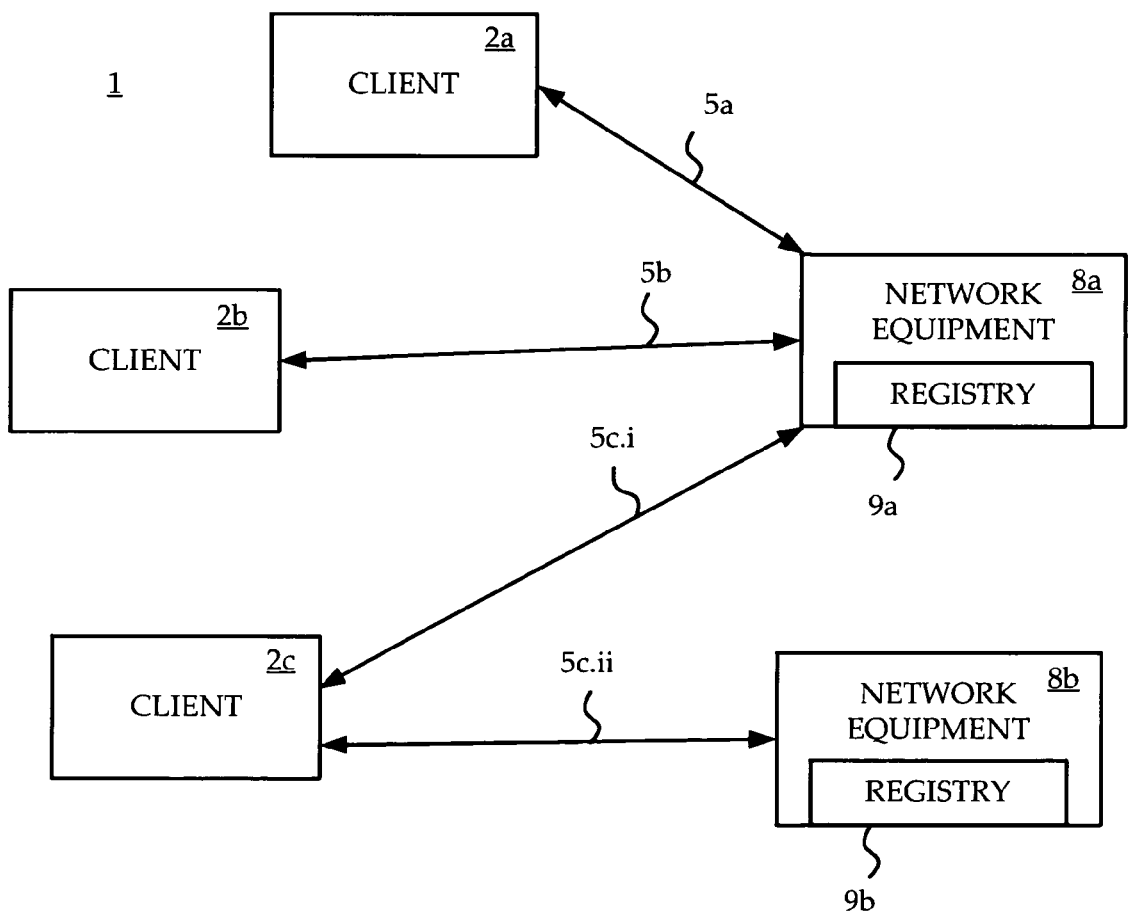
FIG. 1 is a schematic block diagram illustrating prior art key-based authentication.
Figure 2:
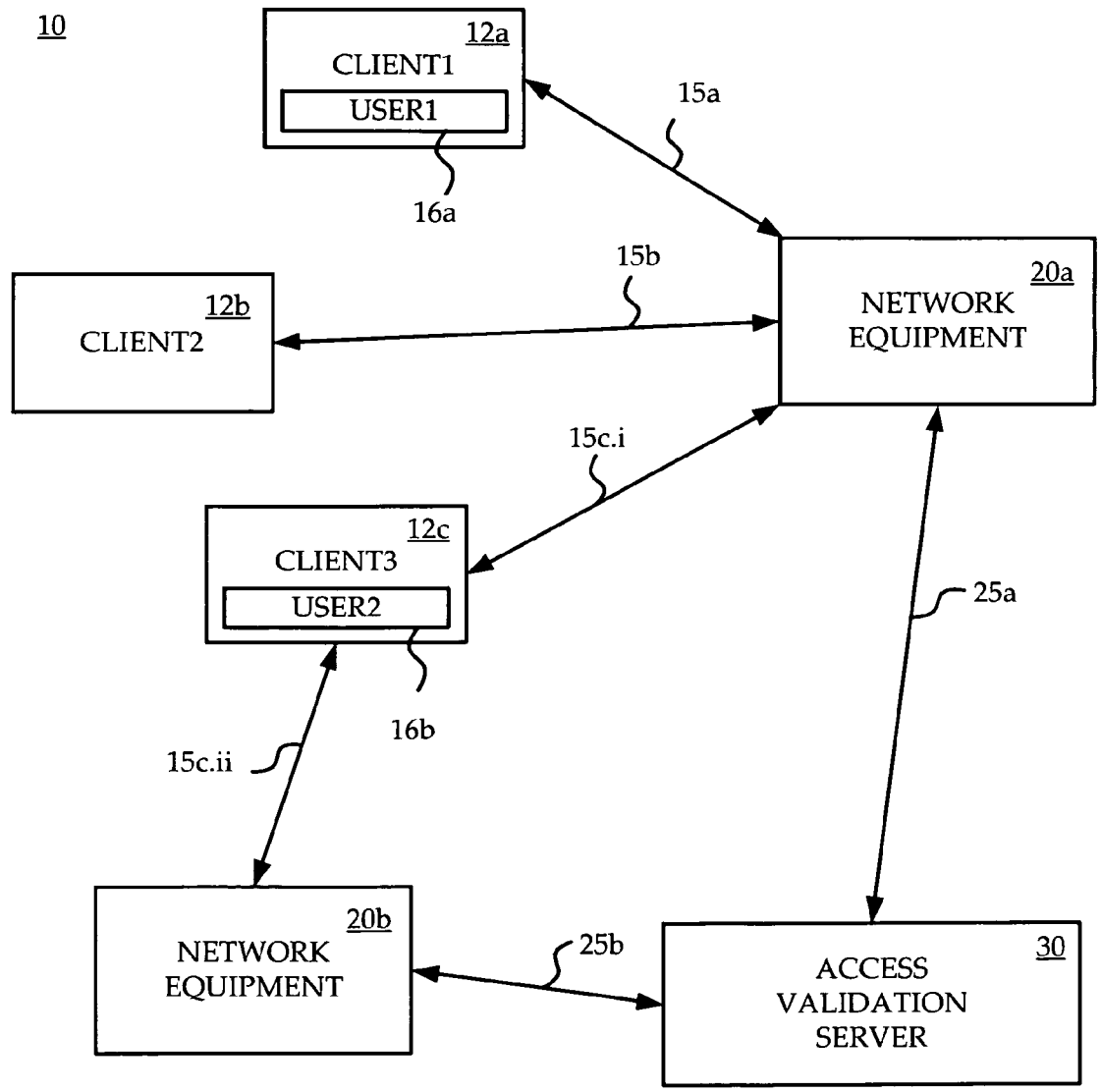
FIG. 2 is a schematic block diagram illustrating a key-based access authentication system according to a preferred embodiment of the invention.

Referring to FIG. 2, a key-based access authentication system for the deployment of a secure protocol in a large distributed and open communications network will now be discussed in terms of structure.

In a communications network 10 a first client machine 12a, a second client machine 12b, and a third client machine 12c are connected respectively by a first network connection 15a, a second network connection 15b, and a third network connection 15c.i to a piece of network equipment 20a. The third client machine 12c is connected by a fourth network connection 15c.ii to a second piece of network equipment 20b. Each piece of network equipment 20a, 20b is connected by a respective first and second validation connection 25a, 25b to an access validation server 30.

Before remote access to network equipment using key-based access authentication can occur, an access entity needs to be registered in the system which hereafter is referred to as registering access of the access entity. An access entity may be a client machine, a user of a client machine, or any other entity which is to be authenticated when it requests access to the network equipment. Depending upon the security requirements of the network, some access entities will be users who access the network equipment from many different client machines, and some access entities will be client machines which themselves may decide for which users they will initiate access.

Figure 3:
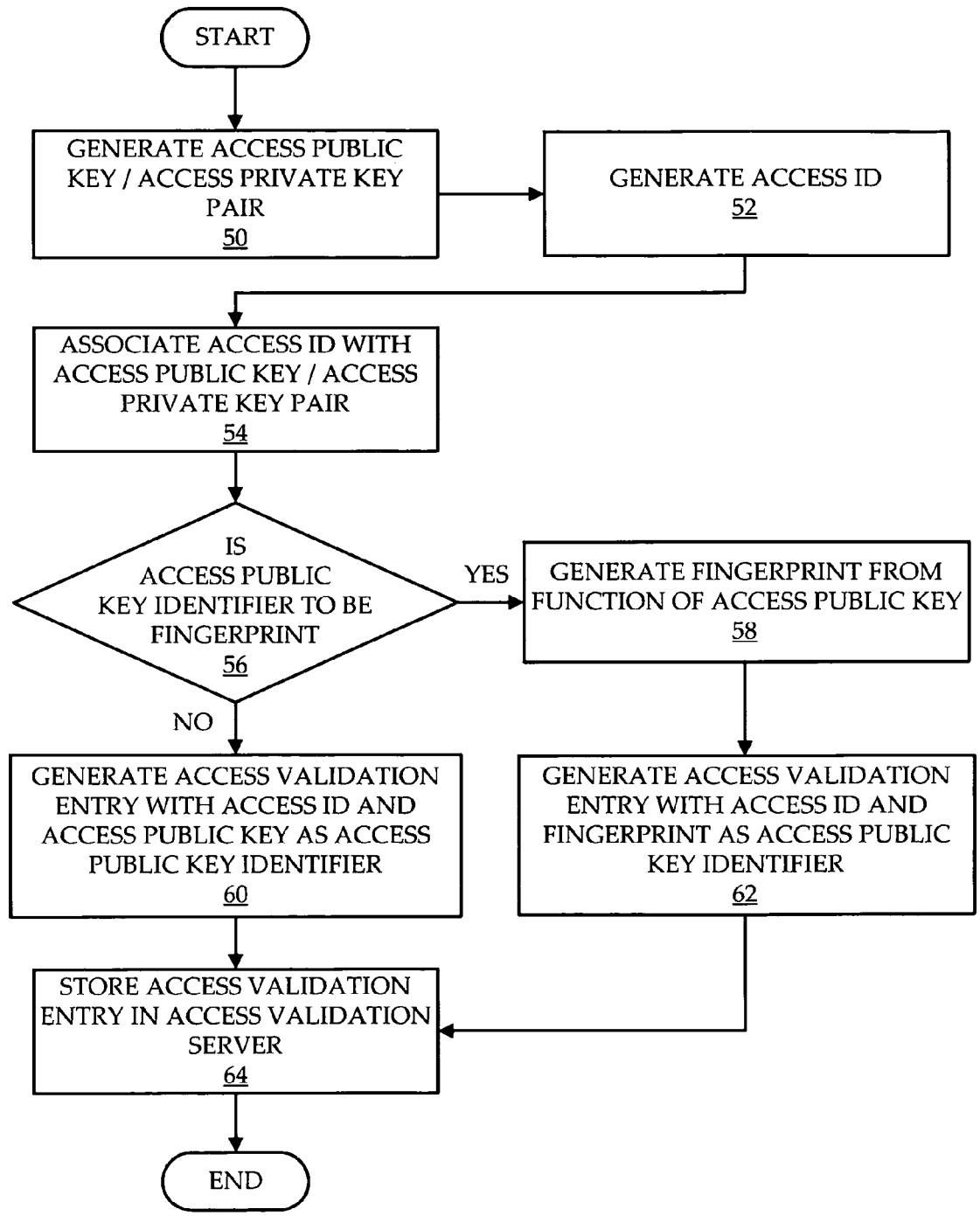
FIG. 3 is a block flow diagram illustrating the steps of a method of registering an access entity of the key-based access authentication system of FIG. 2.
Figure 4A:
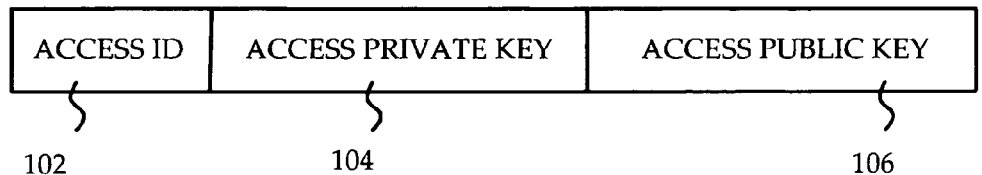
FIG. 4A is a block diagram of example access authentication information of an access entity of the key-based access authentication system of FIG. 2.

Referring also to FIG. 3, the steps for registering access of an access entity in a key-based access authentication system according to a preferred embodiment of the invention are described. For each access entity of the communications network 10 to have its access registered, which in the particular example depicted in FIG. 2 include the first client machine CLIENT1 12a and a user USER2 16b, an access private key/access public key pair is generated in step 50. An access identification or access ID for each access entity is then generated in step 52. Once generated each access entity's access ID is associated in step 54 with the access entity's key pair as access authentication information. This access authentication information, in the case of a client machine access entity, is stored on the client machine, and in the case of a user or other entity, is stored either on a secure token of the user or other entity or is otherwise securely available to the user or other entity. In some cases the client machine from which the user or other entity will access the communications network 10 will store the access authentication information of the user or other entity. FIG. 4A depicts an example of this access authentication information 100 which includes the access ID 102, the access private key 104, and the access public key 106.

The access ID along with an access public key identifier is to be registered with the access validation server 30. Depending upon factors including the nature of the access validation server 30, the access public key identifier may preferably be the access public key itself or a value generated by a function performed on the access public key. The generated value is referred to herein as a fingerprint of the access public key. In step 56 it is determined whether or not the access public key identifier is to be a fingerprint or not. The determination may depend upon the size of the access public key, and the size of the data fields of the access validation server 30 which can be used for the access public key identifier. For example, if the fingerprint is smaller than the access public key and if the access public key is larger than the data fields of the access validation server 30 which can be used for the access public key identifier, then the determination at step 56 will be that yes, the access public key identifier is to be the fingerprint.

If the access public key identifier is to be a fingerprint, a function is performed on the access public key to generate the fingerprint in step 58. Preferably the function used to generate the fingerprint is a cryptographically secure hashing function and specifically should be such that the fingerprint of a valid access public key is unlikely to be produced by the function performed on an invalid key. For the preferred embodiment, the MD5 hashing function is used to generate a fingerprint used as the access public key identifier. Other hashing functions that may be used include MD-4, SHA-1, SHA-256, RIPEMD-128, RIPEMD-160. Once it is determined a fingerprint is to be used, an access validation entry including the access ID and the fingerprint as the access public key identifier is generated at step 60.

If the access public key identifier is not to be a fingerprint, no function is performed on the access public key, and the access public key itself is used as the access public key identifier. Once it is determined a fingerprint is not to be used, an access validation entry including the access ID and the access public key itself as the access public key identifier is generated at step 62.

Once the access validation entry is generated it is stored at step 64 in the access validation server 30. Once the access validation entry is stored, the access ID is referred to as being associated with the access public key identifier.

Figure 4B:
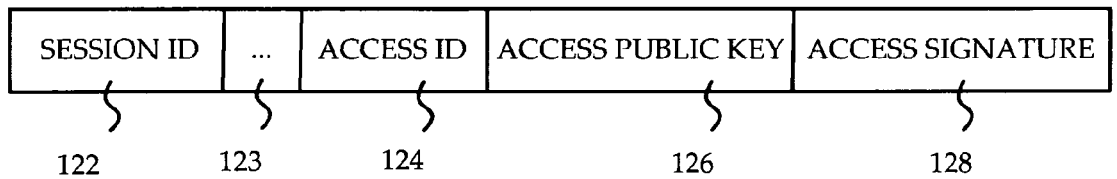
FIG. 4B is a block diagram of fields of an example access authentication request.
Figure 4C:
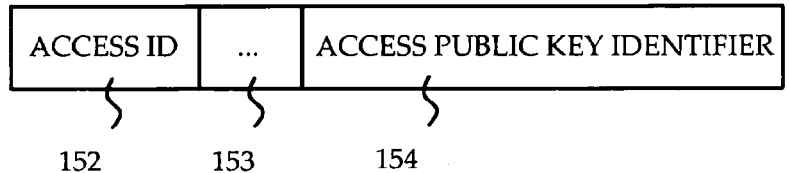
FIG. 4C is a block diagram of an example access validation entry stored in an access validation server.

An example access validation entry stored in the access validation server 30 is depicted in FIG. 4C. The access validation entry 150 includes the access ID 152, other fields which may or may not be present 153, and the access public key identifier 154.

The client machines may be administrator consoles or network management machines or any other client machine for making a secure remote connection to the network equipment. The first, second, third, and fourth network connections 15a, 15b, 15c.i, 15c.ii are secure connections. In the preferred embodiment, the secure connections are SSH connections. The pieces of network equipment 20a, 20b, are network elements which could be network switches, network routers, network servers, or any other network elements for which secure remote connections from a client machine are to be created. The access validation server 30 may be any server which can perform key-based access validation. Typical servers which may be adapted for use as the access validation server 30 include standard authentication, authorization and accounting (AAA) servers (e.g. RADIUS, TACACS+ and Diameter) which are well known and largely used technology. In some cases the access validation server may need to store access validation entries having fingerprints as the access public key identifiers. This is the case where the access validation server does not have the capacity to store the entire access public key in each access validation entry but does have enough capacity to store a fingerprint of the access public key in each access validation entry. In a preferred embodiment, the access validation server 30 is a RADIUS server. Since the RADIUS server 30 has a limited field size for use with the public key identifier, this field traditionally being used for plain text passwords, in the preferred embodiment the MD5 or SHA-1 hashing function is used to generate a fingerprint small enough for use with the RADIUS server 30 from public keys which are too large for use with the RADIUS server 30. Each validation connection 25a, 25b will typically be of a type determined by the access validation server 30 and its method of communication. In the case of a RADIUS server 30, first and second validation connections 25a and 25b will typically be Password Authentication Protocol (PAP) or Challenge Handshake Authentication Protocol (CHAP) connections in which the first piece of network equipment 20a acts as the RADIUS client.

Figure 5:
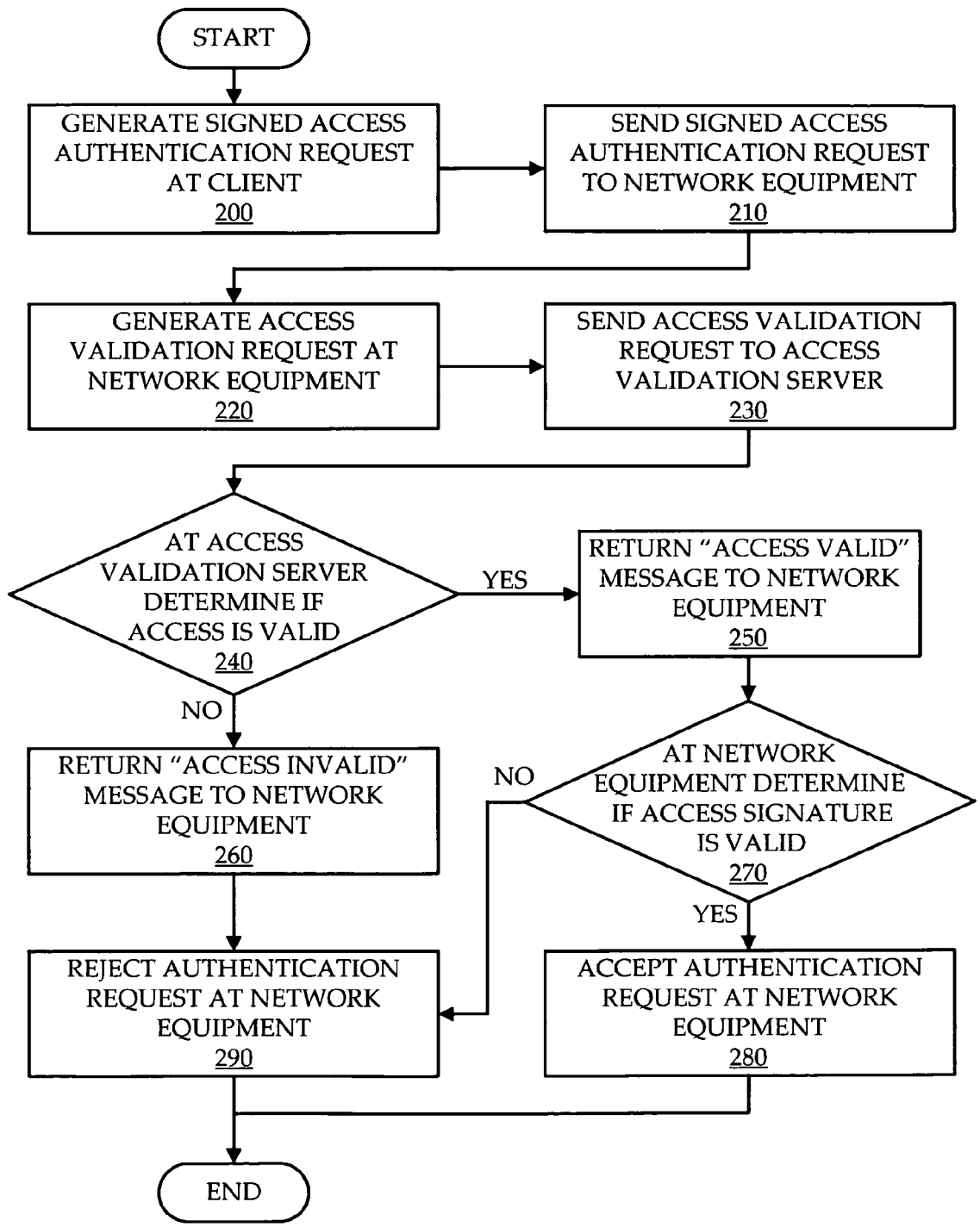
FIG. 5 is block flow diagram illustrating the steps of a method for key-based access authentication according to another embodiment of the invention.

Referring also to FIG. 5, the system of FIG. 2 is described in terms of function for access by the access entity client machine CLIENT1 12a.

The first network connection 15a is established between the first client machine CLIENT1 12a and the first piece of network equipment 20a. In the specific example shown in FIG. 2, this is an SSH transport layer session, in which the first client machine CLIENT1 12a is the SSH client and the first piece of network equipment 20a is the SSH server. Standard steps according to the SSH protocol are taken, namely, the SSH client authenticates the SSH server, and the SSH client and the SSH server establish a common session identifier for the secure channel.

The first client machine CLIENT1 12a generates a signed access authentication request at step 200, an example of which is depicted in FIG. 4B. The signed access authentication request 120 includes standard SSH protocol information such as a session ID 122 and other fields 123 not shown in the Figure but which are understood to be present for proper operation of the protocol. For the purposes of access authentication, included in the access authentication request 120 are the access ID 124, the access public key 126, and an access signature 128. The access signature 128 is generated at the first client machine CLIENT1 12a during step 200 with use of the access private key 104 from the access authentication information 100 residing on the client machine CLIENT1 12a.

Figure 4D:
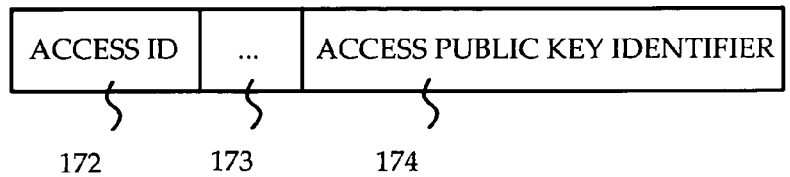
FIG. 4D is a block diagram of fields of an example access validation request.

The first client machine CLIENT1 12a sends in step 210 the access authentication request 120 over the first network connection 15a to the first piece of network equipment 20a. It may be that according to the secure network protocol the access authentication request 120 is sent over multiple messages or multiple exchanges such as in the SSH protocol. Whether sent over a single or over multiple exchanges, the access ID 124, the access public key 126, and an access signature 128 collectively will be understood to be the access authentication request 120. To validate access by the first client machine CLIENT1 12a, the first piece of network equipment 20a generates at step 220 an access validation request, which is illustrated in FIG. 4D. The access validation request 170 includes the access ID 172 and the access public key identifier 174. In the preferred embodiment in which the access validation server 30 is a RADIUS server and therefore stores fingerprints as the access public key identifiers, the first piece of network equipment 20a performs the necessary function (for example the MD5 or SHA-1 hashing function) on the access public key to generate the fingerprint. This fingerprint is then used as the access public key identifier 174 in the access validation request 170. If the access validation server 30 does not store fingerprints but instead stores access public keys as the access public key identifiers, the first network equipment 20a simply generates the access validation request 170 with the access public key as the access public key identifier 174. At step 230 the access validation request 170 is sent over the first validation connection 25a to the access validation server 30. In step 240 the access validation server 30 determines if the access is valid by checking the access ID 172 and the access public key identifier 174 in the access validation request 170 against values stored in its access validation entries 150.

If an access validation entry 150 is found which includes the same access ID 152 and access public key identifier 154 as the access ID 172 and access public key identifier 174 found in the access validation request 170, the access is determined to be valid. At step 250 an "access valid" return message indicating that the access is valid is sent back over the first validation connection 25a to the first piece of network equipment 20a. The actual data value of the "access valid" message itself will typically depend upon the protocol of the validation connection 25a, but will not matter as long as the first piece of network equipment 20a understands that the "access valid" message indicates that the access is valid.

If no access validation entry 150 is found which includes the same access ID 152 and access public key identifier 154 as the access ID 172 and access public key identifier 174 of the access validation request 170, the access is determined to be invalid. At step 260 an "access invalid" return message indicating that the access is invalid is sent back over the first validation connection 25a to the first piece of network equipment 20a. The actual data value of the "access invalid" message itself will typically depend upon the protocol of the validation connection 25a, but will not matter as long as the first piece of network equipment 20a understands that the "access invalid" message indicates that the access is invalid.

After receiving a return message from the validation server 30, the first piece of network equipment 20a authenticates the access by the first client machine CLIENT1 12a by accepting or rejecting the access authorization request as described in the following steps.

In step 290 in the case where the first piece of network equipment 20a receives an "access invalid" message, the access authentication request 120 received from the first client machine CLIENT1 12a is rejected at the first piece of network equipment 20a, and the first network connection 15a is severed. In the preferred embodiment in which the first network connection 15a is an SSH transport layer session, the session is terminated before authentication is complete.

If an "access valid" message is returned to the first piece of network equipment 20a, the first piece of network equipment 20a then determines in step 270 if the access signature 128 is valid. The first piece of network equipment 20a determines if the access signature 128 is valid using the access public key 126, since if the access signature 128 is valid, it would have been generated with use of the access private key 104. If the access signature 128 is invalid, that is if it were not generated with use of the access private key 104, use of the access public key 126 by the first piece of network equipment 20a would determine that the access signature is not valid.

If in step 270 the first piece of network equipment 20a determines that the access signature 128 is valid, it accepts in step 280 the access authentication request 120 of the first client machine CLIENT1 12a and completes the establishment of the secure connection over 15a.

If in step 270 the first piece of network equipment 20a determines that the access signature 128 is invalid, it rejects in step 290 the access authentication request 120 received from the first client machine CLIENT1 12a and severs the connection over 15a, and in the case that the first network connection 15a is an SSH transport layer session, the session is terminated before authentication is complete.

Referring again to FIGS. 2 and 5, the system of FIG. 2 is described in terms of function when providing access to an access entity such as an administrator user USER2 16b. When USER2 16b registers access with the system, user USER2 16b has his or her access authentication information registered with the system and an access validation entry for USER2 16b is stored at the access validation server 30. As mentioned above the access authentication information may be stored at the client machine CLIENT3 12c or on a secure token possessed by the user USER2 16b or may be stored with some other secure element so that it is otherwise securely available to either the user USER2 16b or the client machine CLIENT3 12c.

When the user USER2 16b accesses from the third client machine CLIENT3 12c a piece of network equipment for example either the first piece of network equipment 20a over the third network connection 15c.i or the second piece of network equipment 20b over the fourth network connection 15c.ii, the system functions in the same manner as it does when the access entity is a client machine such as with the first client machine CLIENT1 12a discussed above, except that the system uses the user's access authentication information 100 and may perform extra steps in generating the access authentication request 120.

During the generation of the signed access authentication request 120, the access private key 104 of the user USER2 16b is used. For access of the second piece of network equipment 20b over the third network connection 15.iii, if the access authentication information 100 resides on the client machine CLIENT3 12c or if the client machine CLIENT3 12c otherwise has access to the access private key 104, the client machine CLIENT3 12c can generate the access signature 128 itself using the access private key 104. If the client machine CLIENT3 12c does not have access to the access private key 104 of the user USER2 16b, it can ask for the secure token, or other secure element in which the access authentication information 100 is stored, to sign the access authentication request for the client machine CLIENT3 12c before the request is sent. Irrespective of whether the access authentication request 120 is signed by the client machine CLIENT3 12c itself or signed elsewhere and returned to the client machine CLIENT3 12c, generation of the signed access authentication request 120 is understood to occur at the client machine CLIENT3 12c.

Since the generation and storage of the access validation entry 170 occurs only once per access entity, and since it resides remotely from the network elements, the system avoids any modification of network equipment when an access entity is added to the system. All additions and modifications occur at the access validation server 30 and only occur when an access entity is added, when an access entity's privileges or information are modified or when the access entity is removed from the system.

In some embodiments, the access validation server is capable of additional functions such as authorization or accounting, in which case additional information may be included in the access validation entries 150, in for example the other fields 173, to effect additional functionality. In such a case the access authentication request 120 can also include, in for example the other fields 123, further information for this purpose. If for example an access entity had authority to perform certain actions on a certain piece of network equipment such information could be stored in the access validation server 30 to additionally authorize the access entity to perform those actions on that network equipment. The access authorization request 120 would include the further information regarding the requested action, and the other fields 153 of the access validation request 150 would carry the necessary information for the authorization or accounting to be performed by the validation server 30 in respect of the requested action. Many permutations and combinations of additional functionality may be added to the system for access authentication according to the invention without compromising the nature of the key-based access authentication provided.

It should be understood that although a specific number of client machines and pieces of network equipment have been described, any number of client machines and pieces of network equipment may be utilized in accordance with the invention.

Although only one access validation server has been discussed it should be understood that a plurality of access validation servers may be part of a system according to the invention.

The embodiments presented are exemplary only and persons skilled in the art would appreciate that variations to the embodiments described above may be made without departing from the spirit of the invention. The scope of the invention is solely defined by the appended claims.

We claim:

1. A network element that receives an access authentication request from a client, generates an access validation request comprising a fingerprint of an access public key and an access identification, sends the access validation request to an access validation server and receives a return message indicating a validity of an access to the network element when both the access identification and the fingerprint are valid.

2. The network element according to claim 1, wherein the network element receives the access authentication request as part of an establishment of a secure network connection between the client and the network element.

3. The network element according to claim 2, wherein the secure network connection is a Secure Shell (SSH) connection.

4. The network element according to claim 1, wherein the network element generates the fingerprint by performing a function on the access public key.

5. The network element according to claim 4, wherein the function performed to generate the fingerprint is such that the size of the fingerprint is smaller than the size of the access public key.

6. The network element according to claim 5, wherein the function is a secure hashing function.

7. The network element according to claim 6, wherein the function is a Message-Digest algorithm 5 (MD5) hashing function.

8. The network element according to claim 6, wherein the function is a Secure Hash Algorithm 1 (SHA-1) hashing function.

9. The network element according to claim 1, wherein the network element authenticates the access with use of the return message.

10. The network element according to claim 9, wherein the access authentication request further comprises an access signature generated with use of an access private key of the access entity, and wherein the network element authenticates the access with use of the access signature.

11. The network element according to claim 10, wherein the network element determines a validity of the access signature with use of the access public key and wherein the network element accepts the access authentication request if the return message indicates the access is valid and if the network element determines the access signature is valid.

12. The network element according to claim 11, wherein the network element rejects the access authentication request if the return message indicates the access is invalid and rejects the access authentication request if the network element determines the access signature is invalid.

13. The network element according to claim 1, wherein the network element is one of a network switch, a network router, and a network server.

14. An access validation server that receives an access validation request from a network element, searches a local database for a stored access validation entry comprising a fingerprint and an access identification, sends a return message indicating a validity of an access to the network element, wherein an access to the network element is approved when both the access identification and the fingerprint are valid.

15. The access validation server according to claim 14, wherein a local database of the access validation server stores the access validation entry.

16. The access validation server according to claim 14, wherein the access validation server is an Authentication Authorization and Accounting (AAA) server.

17. The access validation server according to claim 14, wherein the access validation server is a Remote Authentication Dial In User Service (RADIUS) server.

18. A method of key-based access authentication comprising:

receiving an access authentication request from a client at a network element, said access authentication request comprising an access public key of an access entity and an access identification of the access entity for an access of the network element by the access entity;

generating, at the network element, an access validation request comprising a fingerprint of the access public key and the access identification;

sending the access validation request from the network element to an access validation server;

receiving, at the network element, from the access validation server, a return message indicating a validity of the access when both the access identification and the fingerprint are valid; and authenticating the access, at the network element, with use of the return message.

19. The method of key-based access authentication according to claim 18, further comprising:

receiving, with the network element, the access authentication request as part of an establishment of a secure network connection between the client and the network element.

20. The method of key-based access authentication according to claim 18, further comprising:

generating the fingerprint of the access public key by performing a secure hashing function on the access public key such that a size of the fingerprint is smaller than a size of the access public key.

21. The method of key-based access authentication according to claim 18, further comprising:

generating an access signature with use of an access private key of the access entity;

determining a validity of the access signature with use of the access public key to generate a determination of validity of the access signature;

accepting the access authentication request when both the return message indicates the access is valid and the determination of validity of the access signature indicates the access signature is valid;

rejecting the access authentication request if the return message indicates the access is invalid; and rejecting the access authentication request if the determination of validity of the access signature indicates the access signature is invalid.

\* \* \* \* \*